United States Patent
Ishihara

(10) Patent No.: US 6,882,448 B2
(45) Date of Patent: Apr. 19, 2005

(54) FACSIMILE SYSTEM, AND FACSIMILE TERMINAL AND FORMAT CONVERTER BOTH FOR USE IN THE SYSTEM

(75) Inventor: Atsushi Ishihara, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 795 days.

(21) Appl. No.: 09/803,848

(22) Filed: Mar. 12, 2001

(65) Prior Publication Data

US 2001/0028467 A1 Oct. 11, 2001

(30) Foreign Application Priority Data

Apr. 6, 2000 (JP) ........................ 2000-105147

(51) Int. Cl.$^7$ ............................ B41B 1/00; G06F 15/00
(52) U.S. Cl. ................... 358/1.9; 358/1.15; 358/402
(58) Field of Search ............................... 358/1.9, 1.15, 358/402

(56) References Cited

U.S. PATENT DOCUMENTS 6,094,277 A 7/2000 Toyoda
6,230,189 B1 * 5/2001 Sato et al. ................ 709/206

FOREIGN PATENT DOCUMENTS

JP          11-27501          1/1999

* cited by examiner

Primary Examiner—Kimberly Williams
Assistant Examiner—Charlotte Baker
(74) Attorney, Agent, or Firm—Frishauf, Holtz, Goodman & Chick, P.C.

(57) ABSTRACT

The Internet-based facsimile prints an image shown by the image data attached to the e-mail when e-mail addressed to itself arrives. However, the Internet-based facsimile requests the format converter to convert the format of the image data if the image data is of the file format which the Internet-based facsimile is unable to process. The format converter converts the format of the image data to the predetermined format in response to the request from the Internet-based facsimile and returns it to the Internet-based facsimile that originally requested the conversion. The Internet-based facsimile prints the image shown by the image data returned from the format converter.

13 Claims, 3 Drawing Sheets

FACSIMILE SYSTEM, AND FACSIMILE TERMINAL AND FORMAT CONVERTER BOTH FOR USE IN THE SYSTEM

CROSS-REFERENCE TO RELATED APPLICATIONS

This application is based upon and claims the benefit of priority from the prior Japanese Patent Application No. 2000-105147, filed Apr. 6, 2000, the entire contents of which are incorporated herein by reference.

BACKGROUND OF THE INVENTION

1. Field of the Invention

The present invention relates to a facsimile system for carrying out facsimile communication via a computer network such as Internet and a facsimile terminal and a format converter used in the facsimile system.

2. Description of the Related Art

With a facsimile terminal such as so-called Internet-based facsimile, facsimile communication is carried out through a computer network such as Internet, etc. This facsimile communication is achieved by transmitting and receiving e-mail with image data attached. The image data is attached to e-mail as a data file of a predetermined file format, such as TIFF-FX format, etc.

However, there are various other file formats used for image transmission via the computer networks, such as BMP format, PDF format, etc. Consequently, there are cases in which image data of the file format different from that which the terminal supports may be transmitted to the facsimile terminal. In the facsimile terminal, it is naturally unable to reproduce the image from the data of the file format that is not supported, and the image is unable to be outputted.

Therefore, in such event, the conventional facsimile terminal gives an error report to the user of its own terminal, terminal of the sender, or controller of the network to which its own terminal is connected. And transmitting e-mail again with the image data of the file format which the receiver side facsimile terminal supports attached in conformity to this kind of report can complete the image communication. However, carrying out e-mail transmission again in this way throws the first e-mail transmission down the drain and causes extremely big waste.

Now, this kind of facsimile terminal is assumed to be used in such a manner a plurality of terminals are connected to LAN linked up with Internet in companies. Under this kind of use form, it could be thought that the file format converting function is provided with the server located between Internet and LAN so that e-mail that arrives at each facsimile terminal is given as e-mail with the image data of the file format supported by the facsimile terminal.

However, if the server is configured in this way, the server must process all the e-mails that are sent to all the facsimile terminals, and the load becomes excessively large. Consequently, a server with extremely high processing capabilities must be used and the cost will increase tremendously.

BRIEF SUMMARY OF THE INVENTION

Accordingly, it is an object of the present invention to efficiently achieve facsimile reception via computer networks with a simple configuration.

To attain the object, a facsimile system according to the invention is designed to receive image data transmitted through a predetermined computer network having a facsimile terminal and a format converter connected to each other. The facsimile system comprises: image outputting means provided in the facsimile terminal for outputting the image based on the image data of a predetermined format arriving with the address directed to itself, conversion requesting means provided in the facsimile terminal for transmitting the image data to the format converter only when the image data format differs from the predetermined format, format converting means provided in the format converter for converting the format of the image data transferred from the facsimile terminal to the predetermined format, returning means provided in the format converter for transferring the image data after the format is converted by the format converting means to the facsimile terminal which has originally transferred the image data, the source of the image data, and image output controlling means provided in the facsimile terminal for allowing the image outputting means for outputting the image data transferred from the format converter as the image data arriving with the address directed to itself.

To achieve the object mentioned above, a facsimile terminal composing a facsimile system for receiving image data transmitted through a predetermined computer network by being connected with a predetermined format converter, the facsimile terminal comprising: image outputting means for outputting an image based on image data of a predetermined format which has arrived with the address directed to itself, conversion requesting means for transferring the image data to the format converter only when the format of the image data which has arrived with the address directed to itself differs from the predetermined format, and an image output controlling means that allows the image outputting means to output the image data transferred from the format converter as the image data which has arrived with the address directed to itself.

To achieve the object mentioned above, a format converter formed by connecting the facsimile system for receiving image data transmitted via a predetermined computer networks to the facsimile terminal provided with a function for outputting an image based on image data of the predetermined format, the format converter comprising: format converting means for converting the format of the image data transferred from the facsimile terminal into the predetermined format, and returning means for transferring the image data whose format has been converted by the format converting means to the facsimile terminal which has originally transferred the image data that served as the source of the image data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Referring now to drawings, one embodiment of the present invention will be described in detail.

Figure 1:
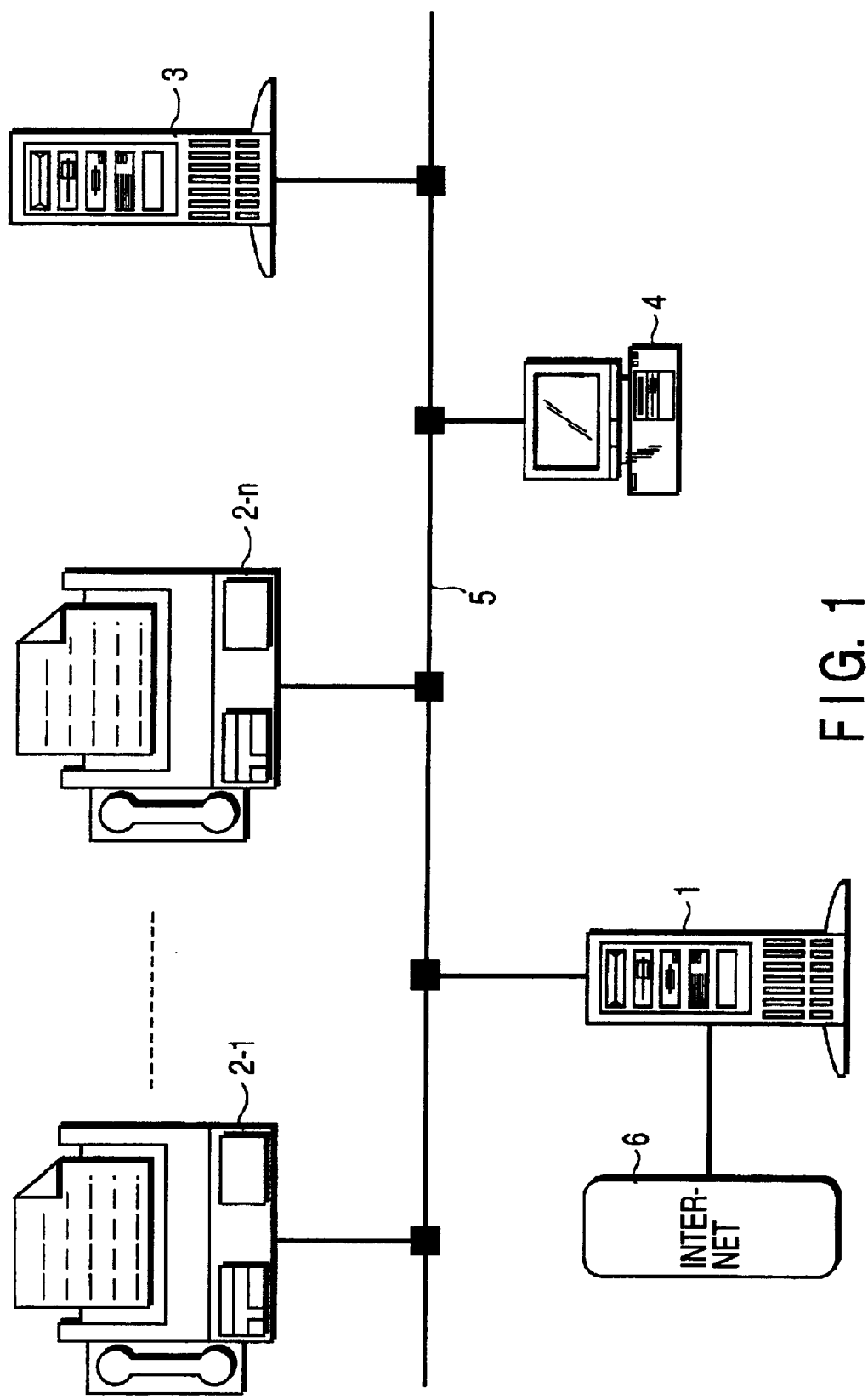
FIG. 1 is a block diagram showing the outline of the facsimile system related to one embodiment of the present invention.

FIG. 1 is a block diagram showing the outline of the facsimile system related to one embodiment of the present invention.

As shown in this drawing, the facsimile system of the present embodiment comprises one Internet server 1, a plurality of (n units) of Internet-based facsimile terminals 2-1 to 2-n, one format converter 3 and one Manager server 4 are connected to one another via LAN5.

Internet server 1 is also connected to Internet 6. And Internet server 1 imports the data that is addressed to the terminal connected to LAN5 and arrives via Internet 6 and outputs to LAN5. In addition, the Internet server 1 receives the data transferred via Internet 6 and sends out to Internet 6.

Internet-based facsimile terminals 2-1 to 2-n carries out facsimile communication with the other Internet-based facsimile terminals 2-1 to 2-n via LAN5 or the Internet-based facsimile not illustrated and connected via Internet 6, respectively.

The format converter 3 carries out processing for converting the file format of the image data in response to the request from the Internet-based facsimile terminals 2-1 to 2-n.

The Manager server 4 carries out various processes for managing LAN5.

Figures 2, 3:
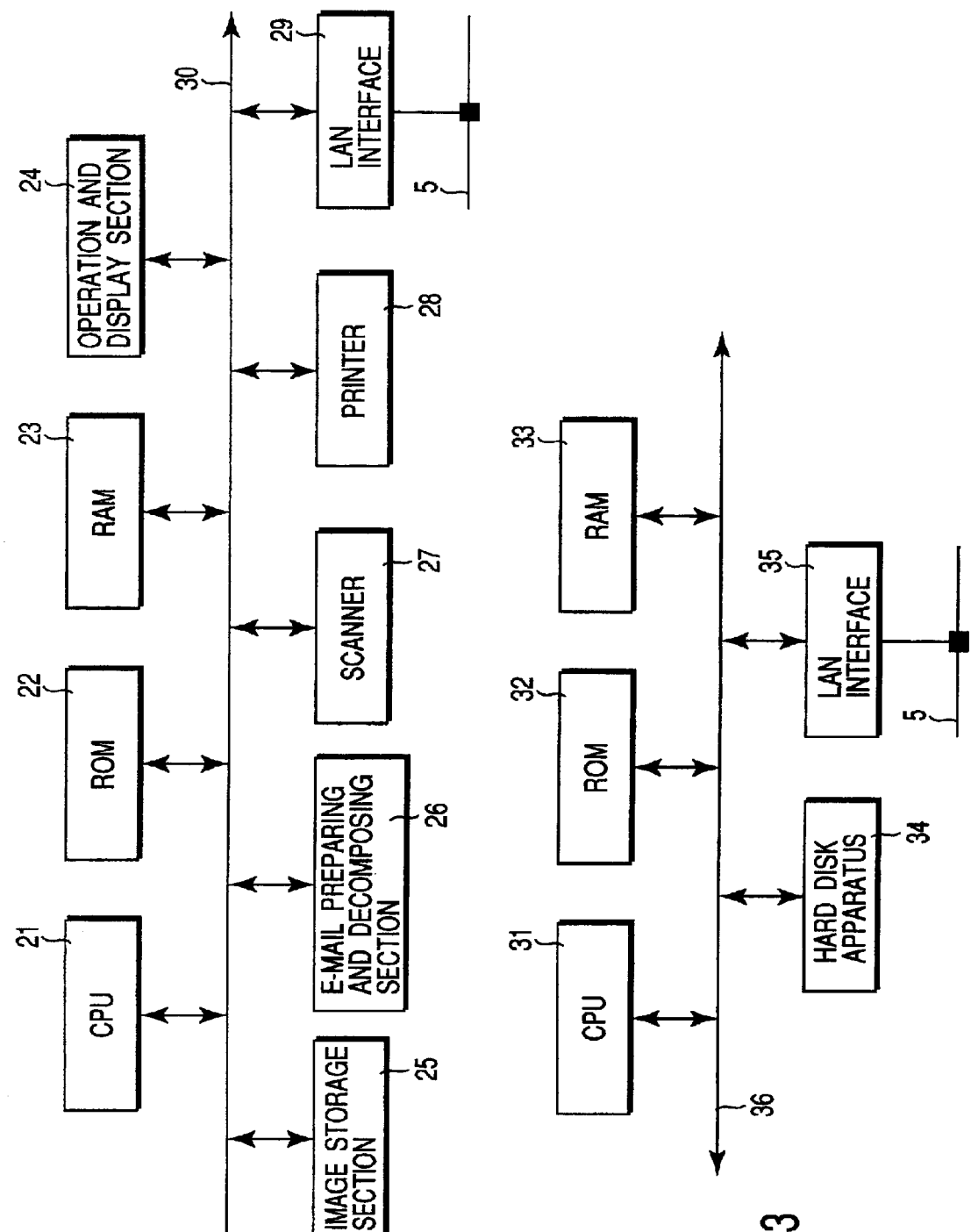
FIG. 2 is a block diagram showing a specific configuration example of the principal section of the Internet-based facsimile of FIG. 1.
FIG. 3 is a block diagram showing a specific configuration example of the principal section of the format converter of FIG. 1.

FIG. 2 is a block diagram showing a specific configuration example of the principal section of Internet-based facsimile terminals 2-1 to 2-n.

As shown in this figure, Internet-based facsimile terminals 2-1 to 2-n comprises CPU21, ROM22, RAM23, operation and display section 24, image storage section 25, e-mail preparing and decomposing section 26, scanner 27, printer 28, and LAN interface 29. And each section of these is connected to one another via bus 30.

CPU21 carries out control procedure for blanket-controlling each section in conformity to the control program stored in ROM22 to achieve operation as Internet-based facsimile.

ROM22 stores control program, etc. of CPU21.

RAM23 is used for storing various information that is required for CPU21 to carry out various processes.

The operation and display section 24 has a key entry section for receiving various instruction inputs by user to CPU21, the display section for displaying various kinds of information to be reported to the user under the control of CPU21.

The image storage section 25 is composed by using, for example, a large-capacity DRAM, hard disk apparatus, etc., where the received image data and image data waiting for transmission are temporarily stored in memory.

The e-mail preparing and decomposing section 26 prepares e-mail with the data file that shows the image data to be transmitted in the TIFF-FX format attached. In addition, the e-mail preparing and decomposing section 26 decomposes the e-mail that arrives addressed to its own terminal and extracts various kinds of control information such as sender information, etc. as well as the attached file. The e-mail preparing and decomposing section 26 reproduces the image data from the attached file of the TIFF-FX format extracted from e-mail that arrived.

The scanner 27 reads the transmitted document and creates the image data that shows the transmitted document.

The printer 28 prints the image which the image data indicates on the printing paper.

To the LAN interface 29, LAN5 is connected. The LAN interface 29 sends out various transmission data to the LAN5 and imports the data with the address directed to its own apparatus transmitted through LAN5.

Now, CPU21 possesses conversion requesting means and converted image output control means in addition to well-known general means in Internet-based facsimile as control means achieved by software processing in conformity to the control program stored in ROM22.

Now, the conversion requesting means allows the e-mail preparing and decomposing section 26 to prepare the predetermined conversion requested mail when the attached file of the e-mail that has arrived with the address directed to its own apparatus is not of the TIFF-FX format and at the same time to send out this conversion-requested mail to LAN5. The conversion-requested mail is the e-mail to which the file attached to the e-mail which has arrived is attached and which is redirected to the format converter 3.

The converted image output control means allows the printer 28 to print the image pursuant to the image data shown by the attached file of the TIFF-FX format attached to the e-mail when the e-mail transmitted from the format converter 3 to its own apparatus arrives.

FIG. 3 is a block diagram showing a specific configuration example of the principal section of the format converter 3.

The format converter 3 is composed by using, for example, general-purpose server apparatus, personal computer, etc. The format converter 3 has CPU31, ROM32, RAM33, hard disk apparatus 34, and LAN interface 35 as shown in the drawing. Each of these sections is connected to one another via bus 36.

CPU31 achieves the format converting means and returning means by carrying out software processing pursuant to the basic program stored in ROM32 and the application program stored in RAM33.

Now, the format converting means converts the file format of the file attached to the conversion-requesting mail sent from Internet-based facsimile terminals 2-1 to 2-n to its own apparatus into the TIFF-FX format.

The returning means prepares the predetermined converted-returned mail and sends out this converted-returned mail to LAN5. The converted-returned mail is e-mail which has the data file converted to TIFF-FX format by the format converting means attached as an attached file and which is addressed to Internet-based facsimile terminals 2-1 to 2-n which originally requested for conversion.

ROM32 stores the basic program of CPU31, etc. in memory.

RAM33 is used for storing various kinds of information that would be required by CPU31 to carry out various kinds of processing. RAM33 is also used for temporarily store the application program stored in the hard disk apparatus 34 in memory to enable CPU31 to use the program.

The hard disk apparatus 34 stores various application programs, e-mail that has arrived, and other various data in memory. The application software stored in this hard disk apparatus 34 and enables CPU31 to achieve the format converting means and returning means is provided by being stored in the storage medium such as CD-ROM or floppy disk and is installed from this storage medium to the hard disk apparatus 34. Or, it may be downloaded via Internet 6 and installed to the hard disk apparatus 34.

To the LAN interface 35, LAN5 is connected. And the LAN interface 35 sends out various transmission data to this LAN5 and imports the data directed to its own apparatus transmitted through LAN5.

Next discussion will be made on the operation of the facsimile system configured as described above.

Because what is featured in the operation of this facsimile system is the operation related to the reception of the e-mail that has arrived with the address directed to any one of Internet-based facsimile terminals 2-1 to 2-n via Internet 6, and other operations are same as the conventional facsimile system, the operation related to the reception only will be described.

Figure 4:
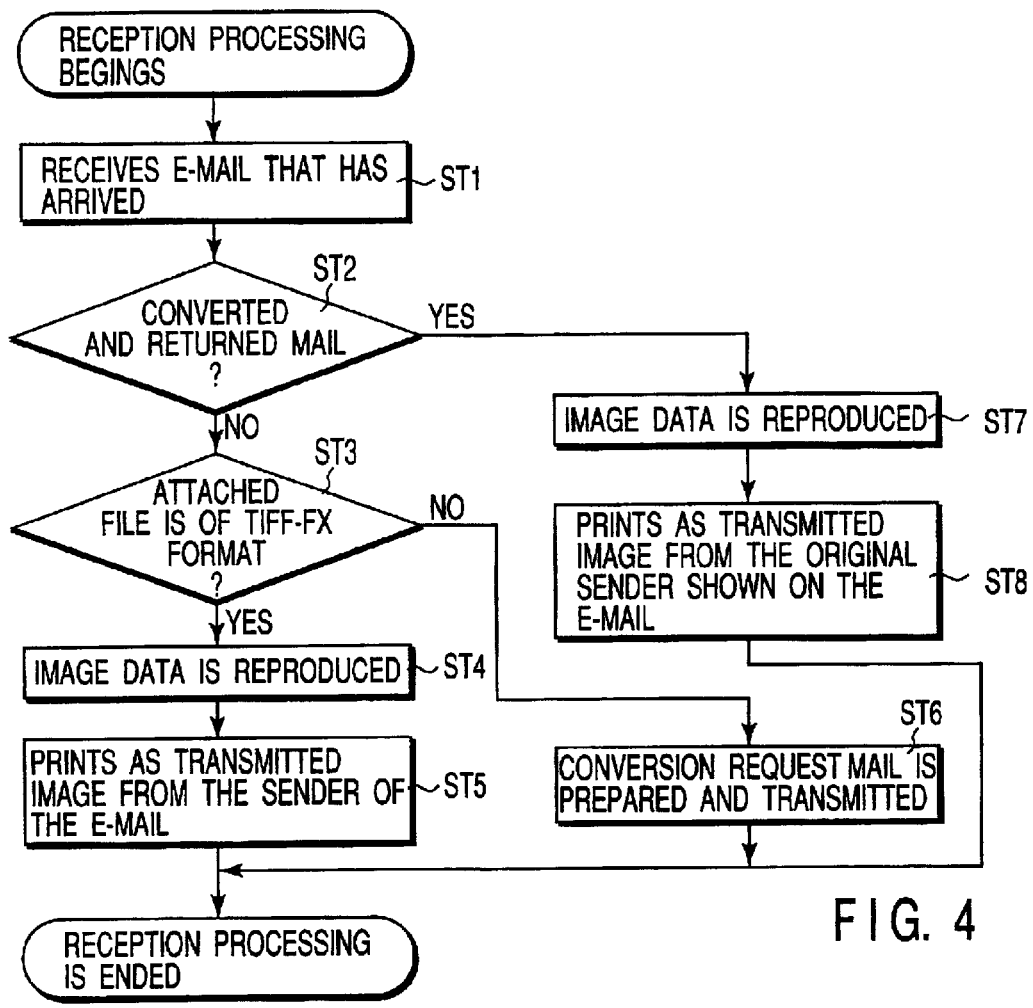
FIG. 4 is a flow chart showing the processing procedure when the data reception is processed by CPU of FIG. 2.

When e-mail arrives with the address directed to the Internet-based facsimile terminals 2-1 via Internet 6, the e-mail is input into the Internet server 1 and output to LAN5. In the Internet-based facsimile terminals 2-1 to which the e-mail is addressed, CPU21 begins the reception processing as shown in FIG. 4. The Internet-based facsimile terminals 2-1 to 2-n operate in the same way. Therefore, only the facsimile terminal 2-1 will be described as for its operation.

In this reception processing, CPU21 first allows the e-mail that has arrived to be received (Step ST1). That is, in this event, CPU21 allows the LAN interface 29 to import the e-mail that has arrived via LAN5 and stores the e-mail in RAM23.

Then, CPU21 confirms whether the e-mail received is the converted-returned mail from the format converter 3 or not (Step ST2). In this event, the e-mail that has arrived at the Internet-based facsimile terminal 2-1 arrived via Internet 6 and is not the converted-returned mail. In such event, CPU21 successively confirms whether the attached file is of the TIFF-FX format or not (Step ST3).

If the attached file is of the TIFF-FX format, the image data can be reproduced form the attached file at the e-mail preparing and decomposing section 26 in its own apparatus. Therefore, in such event, CPU21 allows the e-mail preparing and decomposing section 26 to decompose the e-mail and to reproduce the image data (Step ST4). Then, CPU21 orders the printer 28 to print the image based on the image data reproduced (Step ST5). The image printed here is handled as the transmitted image from the sender that is indicated by the sender information which is shown at the header of the e-mail. That is, for example, when the character string that shows the sender is synthesized with the image to print or when reception history is prepared, the information which the sender information shows is utilized. When the image printing is finished, CPU21 finishes the reception processing of this case.

Now, if the attached file is not of the TIFF-FX format, it is unable to reproduce the image data from the attached file at the e-mail preparing and decomposing section 26 in its own apparatus. Therefore, in such event, CPU21 orders the e-mail preparing and decomposing section 26 to prepare the conversion requesting mail and sends out to LAN5 via the LAN interface 29 (Step ST6). When the dispatch of the conversion requesting mail is finished, CPU21 finishes the recent reception processing. That is, in this stage, CPU21 has not yet carried out printing output of the received image and the original reception operation has not yet been completed, but CPU21 temporarily finishes the reception processing and returns to the wait condition.

Figure 5:
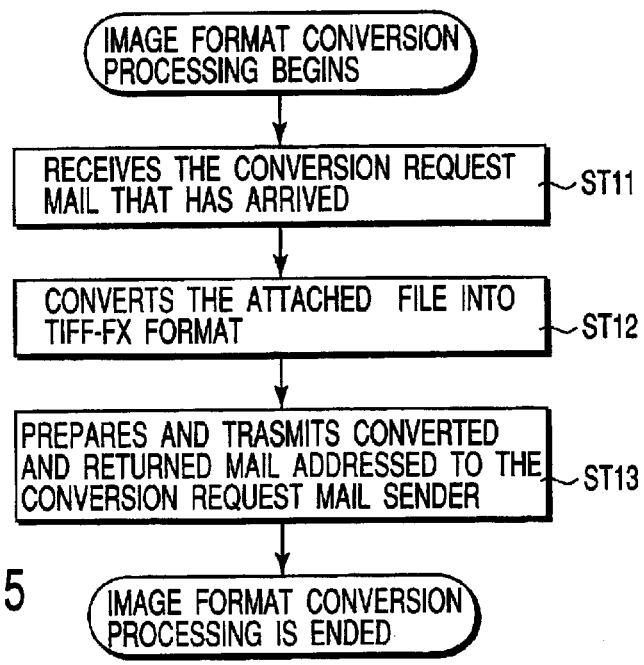
FIG. 5 is a flow chart showing the processing procedure when the image format conversion processing by CPU of FIG. 3 is taking place.

When the conversion request mail is transmitted from the Internet-based facsimile terminal 2-1 as described above, the conversion requesting mail arrives at the format converter 3 via LAN5. Then, CPU31 of the format converter 3 executes the image format conversion processing as shown in FIG. 5.

In this image format conversion processing, CPU31 first allows the conversion requesting mail that has arrived to be received (Step ST11). That is, in this event, CPU31 orders the LAN interface 35 to import the e-mail that has arrived via LAN5 and stores the conversion requesting mail in RAM33.

Then, CPU31 takes out the attached file of the conversion requesting mail received and converts the file format to the TIFF-FX format (Step ST12). Then, CPU31 prepares the converted-returned mail and transmits to LAN5 via the LAN interface 35 (Step ST13). The converted-returned mail has the data file converted to the TIFF-FX format at Step ST12 attached as the attached file. In addition, the converted-returned mail has its address directed to the sender of the conversion requesting mail received at Step ST11.

When the transmission of this converted-returned mail is finished, CPU31 finishes the recent image format conversion processing.

The converted-returned mail transmitted from the format converter 3 in this way arrives at the Internet-based facsimile terminal 2-1 to which the mail is addressed via LAN5. Then, CPU21 executes the reception processing shown in FIG. 4 again in this event.

That is, CPU21 which has transmitted the conversion requesting mail in Step 6 and has temporarily finished the reception processing waits for the arrival of the converted-returned mail, and executes the reception processing again when the converted-returned mail arrives.

In such event, because the e-mail received in Step ST1 is the converted-returned mail, CPU21 orders the e-mail preparing and decomposing section 26 to decompose the converted and returned mail and reproduces the image data (Step ST7). And CPU21 orders the printer 28 to print the image based on the image data reproduced (Step ST8).

Now, in this event, the Internet-based facsimile terminal 2-1 executes printing in conformity to the attached file of the e-mail of the sender, but the original sender of the image to be printed is not the format converter 3. Therefore, in this event, the image is treated as the image transmitted from the sender shown by the sender information of the e-mail received in Step STI in the reception processing when the conversion request is made, not from the sender shown by the sender information shown in the header of the e-mail. That is, when the character string showing the sender is synthesized to the image for printing or when the reception history is prepared, the information shown by the sender information of the e-mail received in Step ST1 in the reception processing when the conversion request is made is utilized. And when printing of the image is finished, CPU finishes the recent reception processing.

Now, when a plurality of conversion requests are continuously made to the format converter 3, it is assumed that the relation between individual conversion request and the conversion and return may become ambiguous. In such event, the management of the sender of the image to be printed is unable to be carried out properly. Therefore, when the sender is controlled with respect to the image to be printed as described above, measures must be taken to prevent the relation between the conversion request and the conversion and return from being ambiguous.

As one of the examples of such measures, the following may be assumed. That is, even if a plurality of received mail for which a conversion request must be made exist, the next conversion request should not be made until the conversion and return is carried out for one conversion request. And until the conversion and return is carried out, the sender information of the e-mail received in Step ST1 should be held in RAM23, etc.

For another method, the following may be assumed. That is, the sender information of the e-mail receive in Step ST1 is contained in the conversion-requesting mail as additional information. And in the converted-returned mail, the additional information contained in the conversion requesting mail should be contained as additional information as it is.

As described above, according to the present embodiment, e-mail is received by each the Internet-based facsimile terminals 2-1 to 2-n. If the attached file of the e-mail that has arrived with the address directed to its own apparatus is of the TIFF-FX format which can be processed by itself, each Internet-based facsimile terminals 2-1 to 2-n reproduces the image data from the attached file and carries out printing output of the image based on the image data. Consequently, as far as the e-mail arrives with the TIFF-FX format file attached as the attached file, no load is applied to the format converter 3.

When Internet-based facsimile terminals 2-1 to 2-n receives the e-mail with the file of no TIFF-FX format attached, a conversion request is made from Internet-based facsimile terminals 2-1 to 2-n to the format converter 3. The format converter 3 converts the attached file into the TIFF-FX format in response to this conversion request. The attached file which has been converted in this way is returned from the format converter 3 to Internet-based facsimile terminals 2-1 to 2-n. And on Internet-based facsimile terminals 2-1 to 2-n, the image data is reproduced from the attached file with the format converted as described above, and the image is printed by a printer in conformity to this image data. Consequently, even when the image data is given as an attached file of the format other than the TIFF-FX format, it is possible to print the image the image data shows at each Internet-based facsimile terminals 2-1 to 2-n. And the load to the format converter 3 can be suppressed to the minimum.

In addition, according to the present embodiment, each Internet-based facsimile terminals 2-1 to 2-n is allowed only to run under the TIFF-FX format and the conversion function from other file format to the TIFF-FX format is equipped only to the format converter 3. Consequently, it is possible to simplify the configuration of the whole system as compared to the case in which the function for reproducing the image data from the data file of a plurality of file formats is equipped to the individual Internet-based facsimile terminals 2-1 to 2-n.

It is understood that the present invention is not limited to the above-mentioned embodiment. For example, in the above embodiment, a format converter 3 that is specialized in format conversion is equipped. However, if there is an allowance in processing capabilities of the Internet server 1 or manager server 4, the format conversion function may be provided for the Internet server 1 or manager server 4.

In addition, in the above embodiment, e-mail is transferred for transferring the data file. However, changes could be made, for example, in transferring the data file by the use of FTP (File Transfer Protocol).

In addition to the above, it is understood that changes within the purview of the appended claims may be made without departing from the true scope and spirit of the invention in its broader aspects.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A facsimile system including a facsimile terminal and a format converter operatively connected to each other, the facsimile system comprising:

a printer provided in the facsimile terminal configured to print an image based on image data of a predetermined format;

receiving means provided in the facsimile terminal for receiving image data transmitted via a computer network;

requesting means provided in the facsimile terminal for transferring the image data to the format converter when the image data format differs from the predetermined format;

converting means provided in the format converter for converting the format of the image data transferred from the facsimile terminal to the predetermined format;

returning means provided in the format converter for transferring the image data after the format is converted by the converting means to the facsimile terminal which has originally transferred the image data; and controlling means provided in the facsimile terminal for controlling the printer to print an image based on the image data transferred from the format converter.

2. A facsimile terminal which is operatively connected to a format converter for forming a facsimile system, the facsimile terminal comprising:

a printer configured to print an image based on image data of a predetermined format;

receiving means for receiving image data transmitted via a computer network;

requesting means for transferring the image data to the format converter when the image data format differs from the predetermined format; and controlling means for controlling the printer to print an image based on the image data transferred from the format converter.

3. The facsimile terminal according to claim 2, wherein the predetermined format is TIFF (Tagged Image File Format).

4. The facsimile terminal according to claim 2, wherein the requesting means transfers the image data to the format converter by sending an e-mail with an attached file containing the image data.

5. The facsimile terminal according to claim 4, wherein the requesting means allows the e-mail to contain sender information for identifying a sender of the image data.

6. The facsimile terminal according to claim 2, further comprising a storage section configured to store sender information for identifying a sender of the transferred image data, the sender information being stored until the image data which is converted to the predetermined format is transferred thereto from the format converter.

7. A format converter operatively connected to a facsimile terminal provided with a function for printing an image based on image data of a predetermined format, the format converter comprising:

converting means for converting the format of the image data transferred from the facsimile terminal into the predetermined format; and returning means for transferring the image data whose format has been converted by the converting means to the facsimile terminal which has transferred original image data whose format is not converted.

8. The format converter according to claim 7, wherein the predetermined format is TIFF (Tagged Image File Format).

9. The format converter according to claim 7, wherein the returning means transfers the image data to the facsimile terminal by sending an e-mail with an attached file containing the image data that has been converted by the format converting means.

10. The format converter according to claim 9, wherein the returning means allows sender information in the e-mail with an attached file containing the original image data to be included in an e-mail with an attached file containing the converted image data.

11. A method of outputting an image corresponding to image data transmitted via a computer network, the method used in a facsimile system comprising a facsimile terminal including (i) image output means for outputting an image based on image data of a predetermined format, and (ii) a format converter operatively connected to the facsimile terminal, the method comprising the steps of:

receiving image data at the facsimile terminal, the image data being transmitted via the computer network;

transferring the image data from the facsimile terminal to the format converter when the received image data format differs from the predetermined format;

converting the format of the image data, transferred from the facsimile terminal to the format converter, to the predetermined format using the format converter;

transferring the converted image data from the format converter to the facsimile terminal; and controlling the image output means to output an image based on the image data transferred from the format converter to the facsimile terminal.

12. A method of outputting an image using a facsimile terminal, the image corresponding to image data transmitted via a computer network, the method used in a facsimile system comprising (i) the facsimile terminal with image output means for outputting an image based on image data of a predetermined format, and (ii) a format converter operatively connected to the facsimile terminal, the method comprising the steps of:

receiving image data transmitted via the computer network;

transferring the image data to the format converter when the received image data format differs from the predetermined format; and controlling the image output means to output an image based on image data transferred from the format converter.

13. A method of converting a format of image data using a format converter, the image data being transmitted via a computer network, the method used in a facsimile system comprising (i) a facsimile terminal with image output means for outputting an image based on an image data of a predetermined format, and (ii) the format converter being operatively connected to the facsimile terminal, and the method comprising the steps of:

converting a format of image data transferred from the facsimile terminal into the predetermined format; and transferring the converted image data to the facsimile terminal which has transmitted original image data whose format is not converted.

* * * * *